US009050787B2

(12) United States Patent
Gill

(10) Patent No.: US 9,050,787 B2
(45) Date of Patent: Jun. 9, 2015

(54) APPARATUS AND METHOD FOR PROVIDING A LOCALIZED SPEED VARIANCE OF AN ADVANCING SUBSTRATE

(71) Applicant: The Procter & Gamble Company, Cincinnati, OH (US)

(72) Inventor: Nathan Alan Gill, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 75 days.

(21) Appl. No.: 13/741,679

(22) Filed: Jan. 15, 2013

(65) Prior Publication Data

US 2013/0126099 A1 May 23, 2013

Related U.S. Application Data

(62) Division of application No. 12/417,872, filed on Apr. 3, 2009, now Pat. No. 8,377,249.

(51) Int. Cl.
*B32B 38/18* (2006.01)
*B65H 20/24* (2006.01)
(Continued)

(52) U.S. Cl.
CPC .......... *B32B 38/18* (2013.01); *Y10T 29/53543* (2015.01); *Y10T 156/1712* (2015.01);
(Continued)

(58) Field of Classification Search
CPC .......... B65H 2301/4491; B65H 20/02; B65H 20/04; B65H 20/24; B65H 20/34; B65H 23/192; B32B 38/18; B21C 49/00; Y10T 156/1712
USPC .......... 156/543; 226/4, 8, 111, 113, 114, 115, 226/118.2, 18.3, 120, 122, 156, 160, 168, 226/178, 189
See application file for complete search history.

(56) References Cited

U.S. PATENT DOCUMENTS 1,087,558 A    11/1912    Sears
2,723,620 A    8/1951    Huck
(Continued)

FOREIGN PATENT DOCUMENTS

CN    101245839    8/2008
DE    4301650 C1    1/1994
(Continued)

OTHER PUBLICATIONS

Machine translation of JP 2003252499 date unknown.*
(Continued)

*Primary Examiner* — John Goff
(74) *Attorney, Agent, or Firm* — Sarah M. DeCristofaro; Abbey A. Lopez; Charles R. Matson

(57) ABSTRACT

Methods and apparatuses discussed herein provide for localized speed changes of an advancing substrate. Embodiments of a localized speed varying apparatus may include first and second substrate guides positioned upstream and downstream of a processing station, respectively. The substrate guides may utilize orbital motion of guide members to change the length of the substrate within the substrate guides upstream and downstream of the processing station. The changes in substrate length within the substrate guides result in localized speed changes of the substrate between the substrate guides. Coordination between the substrate guides allows for localized speed changes of the substrate passing through the processing station without affecting the speed of the substrate upstream of the first substrate guide and downstream of the second substrate guide.

5 Claims, 8 Drawing Sheets

(51) Int. Cl.
  *B21C 49/00*   (2006.01)
  *B65H 20/02*   (2006.01)

(52) U.S. Cl.
  CPC ............. *B65H20/24* (2013.01); *B21C 49/00* (2013.01); *B65H 20/02* (2013.01); *B65H 2301/4491* (2013.01); *B65H 2801/57* (2013.01)

(56) References Cited

U.S. PATENT DOCUMENTS

| | | |
|---|---|---|
| 3,093,069 A | 6/1963 | Luehrs |
| 3,220,347 A | 11/1965 | Luehrs |
| 3,280,737 A | 10/1966 | Huck |
| 3,507,018 A | 4/1970 | Mayfield et al. |
| 3,559,916 A | 2/1971 | Hilscher |
| 3,605,506 A | 9/1971 | Kuster |
| 3,613,978 A | 10/1971 | Renold |
| 3,659,767 A | 5/1972 | Martin |
| 3,763,717 A | 10/1973 | Lenoir et al. |
| 3,796,360 A | 3/1974 | Alexeff |
| 3,997,254 A | 12/1976 | Yamada et al. |
| 4,011,976 A | 3/1977 | Greer |
| 4,203,540 A | 5/1980 | Giros |
| 4,244,504 A | 1/1981 | Grob et al. |
| 4,292,856 A | 10/1981 | Hamilton |
| 4,564,150 A | 1/1986 | Keene et al. |
| 4,582,271 A | 4/1986 | Takahashi |
| 4,601,387 A | 7/1986 | Köbler |
| 4,698,918 A | 10/1987 | Kotitschke et al. |
| 4,778,093 A | 10/1988 | Renold |
| 4,793,564 A | 12/1988 | Hank et al. |
| 5,163,594 A | 11/1992 | Meyer |
| 5,277,571 A | 1/1994 | Bringing |
| 5,373,761 A | 12/1994 | Brining |
| 5,402,957 A | 4/1995 | Evans |
| 5,407,513 A | 4/1995 | Hayden et al. |
| 5,462,631 A | 10/1995 | Gardner |
| 5,693,165 A | 12/1997 | Schmitz |
| 5,746,869 A | 5/1998 | Hayden et al. |
| 5,758,840 A | 6/1998 | Murakami |
| 5,791,541 A | 8/1998 | Jitsuish et al. |
| 5,825,374 A | 10/1998 | Albertalli et al. |
| 6,050,517 A | 4/2000 | Dobrescu et al. |
| 6,186,501 B1 | 2/2001 | St. Ours |
| 6,293,453 B2 | 9/2001 | Hirose et al. |
| 6,349,867 B1 | 2/2002 | Fernfors |
| 6,596,108 B2 | 7/2003 | McCabe |
| 6,616,026 B1 | 9/2003 | Wittmaier |
| 6,705,499 B1 | 3/2004 | Ruckmann et al. |
| 6,763,749 B2 | 7/2004 | Droste et al. |
| 6,824,032 B2 | 11/2004 | Kumatori |
| 6,830,212 B1 | 12/2004 | Harris |
| 6,969,206 B2 | 11/2005 | Iwanaga et al. |
| 8,377,249 B2 | 2/2013 | Gill |
| 2003/0087740 A1 | 5/2003 | Brinkmann et al. |

FOREIGN PATENT DOCUMENTS

| | | |
|---|---|---|
| EP | 0652174 A1 | 11/1993 |
| EP | 0510251 A1 | 6/1995 |
| EP | 0989084 A2 | 3/2000 |
| EP | 1302424 A2 | 4/2003 |
| EP | 2 105 281 | 9/2009 |
| GB | 1 065 161 A | 4/1967 |
| JP | 2253955 | 10/1990 |
| JP | 4197957 | 7/1992 |
| JP | 5286617 | 11/1993 |
| JP | 7315644 | 12/1995 |
| JP | 7315649 | 12/1995 |
| JP | 9079926 | 3/1997 |
| JP | 9142707 | 6/1997 |
| JP | 9328246 | 12/1997 |
| JP | 2002 234648 | 8/2002 |
| JP | 2003252499 A * | 9/2003 |
| JP | 2004 075212 | 3/2004 |
| JP | 2004 091101 | 3/2004 |
| JP | 2004 115199 | 4/2004 |
| JP | 2004 161485 | 6/2004 |
| WO | WO 95/12491 | 5/1995 |
| WO | WO 95/12539 | 5/1995 |

OTHER PUBLICATIONS

International Search Report dated Jul. 27, 2010, 5 pages.

* cited by examiner

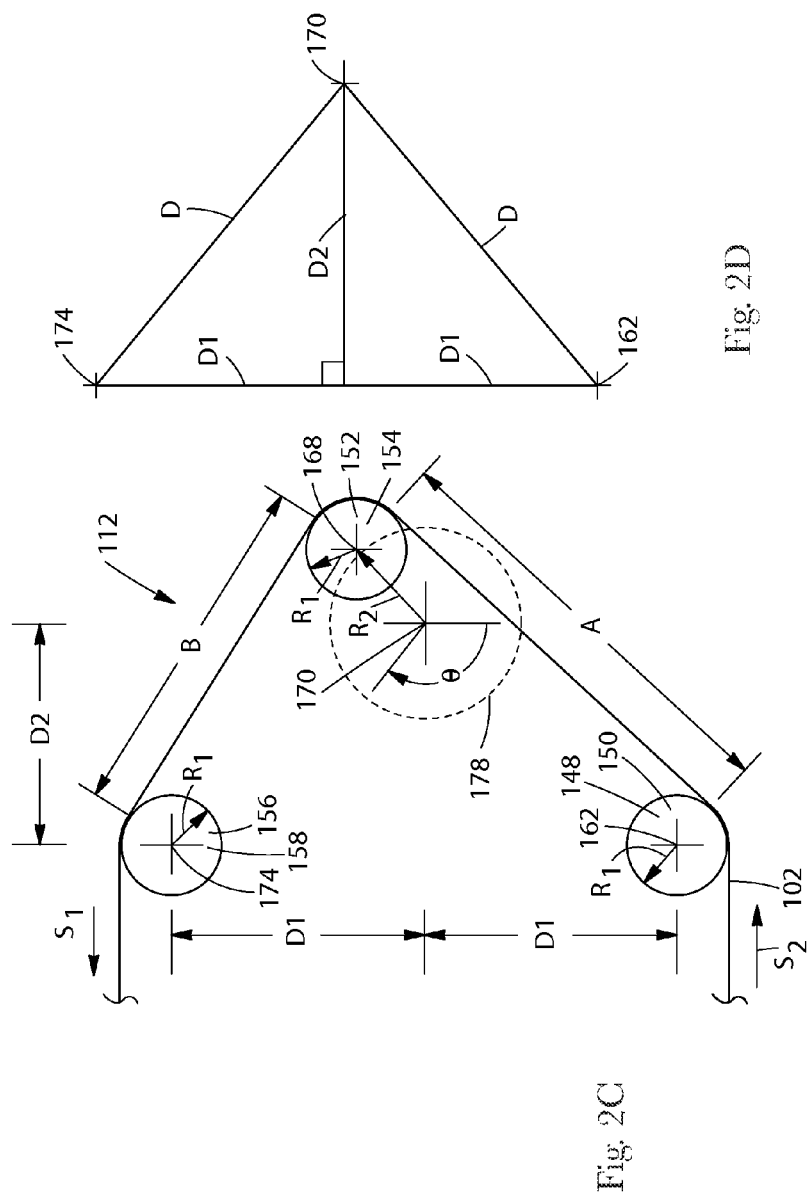

APPARATUS AND METHOD FOR PROVIDING A LOCALIZED SPEED VARIANCE OF AN ADVANCING SUBSTRATE

FIELD OF THE INVENTION

The present disclosure relates to methods and apparatuses utilizing continuous substrates for manufacturing articles, and more particularly, methods and apparatuses for providing a localized speed variance of an advancing substrate.

BACKGROUND OF THE INVENTION

Along an assembly line, various types of articles, such as for example, diapers and other absorbent articles, may be assembled by adding components to and otherwise modifying an advancing, continuous web of material. For example, in some processes, advancing webs of material are combined with other advancing webs of material. In other examples, individual components created from advancing webs of material are combined with advancing webs of material, which in turn, are then combined with other advancing webs of material. Webs of material and component parts used to manufacture diapers may include: backsheets, topsheet, absorbent cores, front and/or back ears, fastener components, and various types of elastic webs and components such as leg elastics, barrier leg cuff elastics, and waist elastics. Once the desired component parts are assembled, the advancing web(s) and component parts are subjected to a final knife cut to separate the web(s) into discrete diapers or other absorbent articles. The discrete diapers or absorbent articles may also then be folded and packaged.

Various methods and apparatuses may be used for attaching different components to the advancing web. Some production operations are configured to advance substrates in a machine direction at a constant speed. However, when advancing webs have components added thereto or are otherwise subjected to processing operations during production, it may be necessary to slow or stop the advancing web. For example, it may be necessary to slow or stop an advancing web passing through a processing station configured to perform such operations as, for example, gluing, welding, and adding discrete components. In an attempt to avoid having to vary the speed of the entire length of a substrate passing through an assembly line, some devices can be used to vary the speed of a portion of the substrate without affecting the speed of the entire substrate. However, such devices may only be configured to slow or stop the portion of the advancing web passing through a processing station for an instant or a very short duration of time. In turn, the processing stations may not be able to complete their respective functions during the relatively short time period while the web is slowed or stopped. In addition, some speed varying devices are configured to engage both sides an advancing web, which may have a negative impact on other process steps.

SUMMARY OF THE INVENTION

Methods and apparatuses for varying the speed of an advancing substrate are disclosed herein. Particular embodiments of the apparatuses and methods provide for localized speed changes of an advancing substrate. Embodiments of a localized speed varying apparatus may include first and second substrate guides positioned upstream and downstream of a processing station, respectively. The substrate guides may utilize orbital motion of guide members to change the length of the substrate within the substrate guides upstream and downstream of the processing station. The changes in substrate length within the substrate guides result in localized speed changes of the substrate between the substrate guides. Coordination between the substrate guides allows for localized speed changes of the substrate passing through the processing station without affecting the speed of the substrate upstream of the first substrate guide and downstream of the second substrate guide.

In one form, an apparatus for advancing a substrate having a first surface disposed opposite a second surface includes: a first substrate guide adapted to receive the substrate advancing at a first speed and discharge the substrate advancing at a second speed; and a second guide mechanism adapted to receive the substrate advancing the second speed and discharge the substrate advancing at the first speed. Each of the first substrate guide and the second substrate guide comprise: a first guide member defining an outer radial surface and a first center axis, wherein the first guide member is positioned such that the first surface of the substrate is disposed on the outer radial surface of the first guide member; a support member adapted to rotate around a second center axis; a second guide member defining an outer radial surface and being connected with the support member such that the second guide member orbits around the second center axis as the support member rotates, wherein the second guide member is positioned such that the substrate advances from the first guide member to the second guide member and such that the first surface of the substrate is disposed on the outer radial surface of the second guide member; and a third guide member defining an outer radial surface and a third center axis, wherein the third guide member is positioned such that the first surface of the substrate is disposed on the outer radial surface of the third guide member. And a first straight line extending directly from the second center axis to the first center axis defines a distance D, wherein a second straight line extending directly from second center axis to the third center axis also defines distance D, wherein the first line is substantially perpendicular to the second line.

In another form, a method for intermittently varying a speed of a portion of an advancing substrate includes the steps of: continuously advancing a substrate in a machine direction at a first speed, the substrate having a first surface disposed opposite of a second surface; engaging the substrate with a first guide member, wherein the first surface of the substrate is disposed on an outer radial surface of a first guide member; advancing the substrate from the first guide member to a second guide member, the second guide member being connected with a support member; engaging the substrate with the second guide member such that the first surface of the substrate is disposed on an outer radial surface of the second guide member; rotating the support member such that the second guide member orbits around a center axis as the support member rotates; advancing the substrate from the second guide member to a third guide member; engaging the substrate with the third guide member, wherein the first surface of the substrate is disposed on an outer radial surface of the third guide member; and advancing the substrate from the third guide member at a second speed, wherein the second speed is variable.

In yet another form, a method for intermittently varying a speed of a portion of an advancing substrate includes the steps of: continuously advancing a substrate in a machine direction at a first speed, the substrate having a first surface disposed opposite of a second surface; engaging the substrate with a first guide member; advancing the substrate from the first guide member to a second guide member, the second roller being connected with a support member; rotating the support member such that the second guide member orbits around a center axis as the support member rotates, and wherein the second guide member obits the center axis at a variable angular velocity; advancing the substrate from the second guide member to a third guide member; and advancing the substrate from the third guide member at a second speed, wherein the second speed is variable.

In still another form, an apparatus for advancing a substrate having a first surface disposed opposite a second surface includes: a first roller defining an outer radial surface and a first center axis, the first roller adapted to rotate around the first center axis, wherein the first roller is positioned to engage a substrate traveling in a machine direction at a first speed; a support member adapted to rotate around a second center axis; a variable speed servo drive connected with the support member adapted to rotate the support member at a variable angular velocity; a second roller defining an outer radial surface and being rotatably connected with the support member such that the second roller orbits around the second center axis as the support member rotates, wherein the second roller is positioned such that the substrate advances from the first roller to the second roller; a third roller defining an outer radial surface and a third center axis, the third roller adapted to rotate around the third center axis and wherein the second roller is positioned such that the substrate advances from the second roller to the third roller, and wherein the substrate advances from the third roller at a second speed.

BRIEF DESCRIPTION OF THE DRAWINGS

FIG. 2C shows the relative positions of components in a second substrate guide of FIG. 1.
FIG. 2D shows a geometrical representation of the relative positions of the components shown in FIG. 2C.

DETAILED DESCRIPTION OF THE INVENTION

Figure 1:
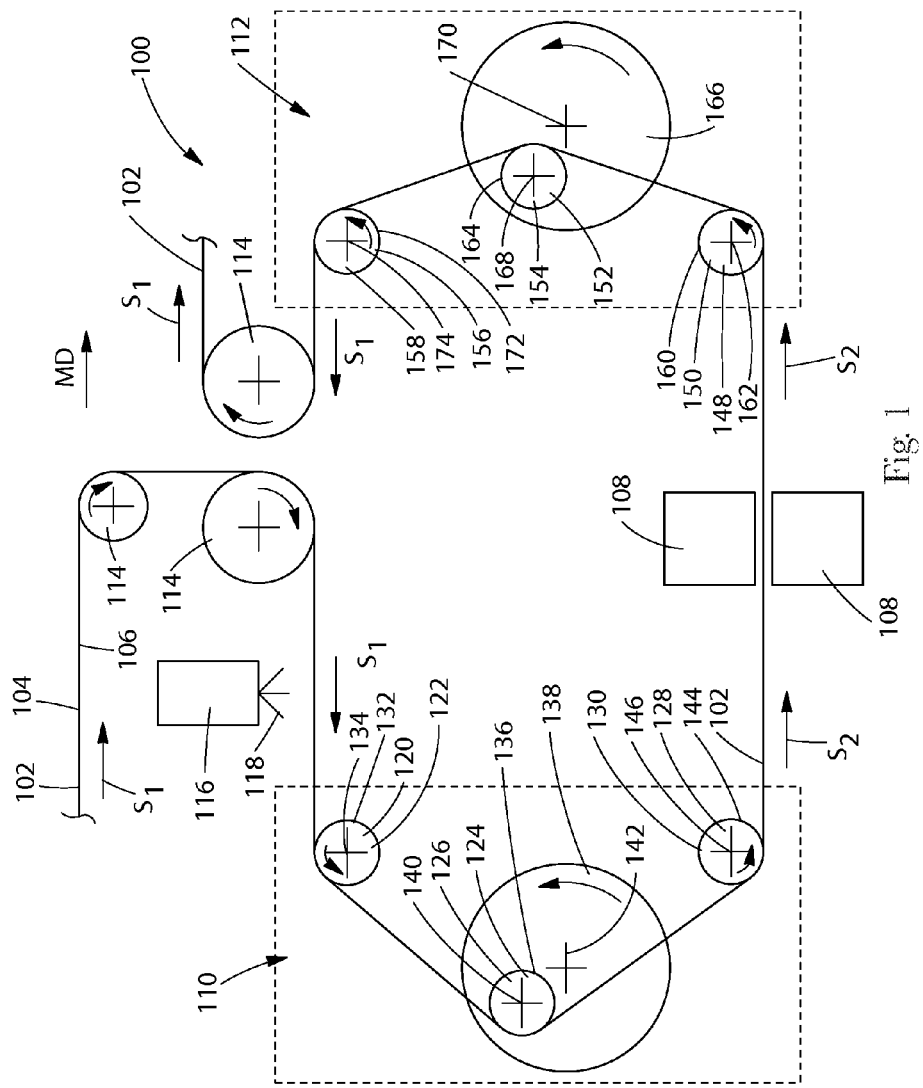
FIG. 1 is a side view of an apparatus according to the present disclosure.

The following term explanations may be useful in understanding the present disclosure:

"Absorbent article" is used herein to refer to consumer products whose primary function is to absorb and retain soils and wastes.

"Diaper" is used herein to refer to an absorbent article generally worn by infants and incontinent persons about the lower torso.

The term "disposable" is used herein to describe absorbent articles which generally are not intended to be laundered or otherwise restored or reused as an absorbent article (e.g., they are intended to be discarded after a single use and may also be configured to be recycled, composted or otherwise disposed of in an environmentally compatible manner).

The term "disposed" is used herein to mean that an element(s) is formed (joined and positioned) in a particular place or position as a macro-unitary structure with other elements or as a separate element joined to another element.

As used herein, the term "joined" encompasses configurations whereby an element is directly secured to another element by affixing the element directly to the other element, and configurations whereby an element is indirectly secured to another element by affixing the element to intermediate member(s) which in turn are affixed to the other element.

The term "substrate" is used herein to describe a material which is primarily two-dimensional (i.e. in an XY plane) and whose thickness (in a Z direction) is relatively small (i.e. 1/10 or less) in comparison to its length (in an X direction) and width (in a Y direction). Non-limiting examples of substrates include a layer or layers or fibrous materials, films and foils such as plastic films or metallic foils that may be used alone or laminated to one or more web, layer, film and/or foil. As such, a web is a substrate.

The term "nonwoven" refers herein to a material made from continuous (long) filaments (fibers) and/or discontinuous (short) filaments (fibers) by processes such as spunbonding, meltblowing, and the like. Nonwovens do not have a woven or knitted filament pattern.

The term "machine direction" (MD) is used herein to refer to the direction of material flow through a process. In addition, relative placement and movement of material can be described as flowing in the machine direction through a process from upstream in the process to downstream in the process.

The term "cross direction" (CD) is used herein to refer to a direction that is generally perpendicular to the machine direction.

The terms "elastic" and "elastomeric" as used herein refer to any material that upon application of a biasing force, can stretch to an elongated length of at least about 110% of its relaxed, original length (i.e. can stretch to 10% more than its original length), without rupture or breakage, and upon release of the applied force, recovers at least about 40% of its elongation. For example, a material that has an initial length of 100 mm can extend at least to 110 mm, and upon removal of the force would retract to a length of 106 mm (40% recovery). The term "inelastic" refers herein to any material that does not fall within the definition of "elastic" above.

The term "extensible" as used herein refers to any material that upon application of a biasing force, can stretch to an elongated length of at least about 110% of its relaxed, original length (i.e. can stretch to 10%), without rupture or breakage, and upon release of the applied force, shows little recovery, less than about 40% of its elongation.

The terms "activating", "activation" or "mechanical activation" refer to the process of making a substrate, or an elastomeric laminate more extensible than it was prior to the process.

"Live stretch" includes stretching elastic and bonding the stretched elastic to a substrate. After bonding, the stretched elastic is released causing it to contract, resulting in a "corrugated" substrate. The corrugated substrate can stretch as the corrugated portion is pulled to about the point that the substrate reaches at least one original flat dimension. However, if the substrate is also elastic, then the substrate can stretch beyond the relaxed length of the substrate prior to bonding with the elastic. The elastic is stretched at least 25% of its relaxed length when it is bonded to the substrate.

Aspects of the present disclosure involve methods and apparatuses utilizing continuous substrates for manufacturing articles, and more particularly, methods and apparatuses for varying the speed of an advancing substrate. Particular embodiments of the apparatuses and methods disclosed herein provide for localized speed changes of an advancing substrate. As discussed below in more detail, embodiments of a localized speed varying apparatus may include first and second substrate guides positioned upstream and downstream of a processing station, respectively. The substrate guides utilize orbital motion of guide members to change the length of the substrate within the substrate guides upstream and downstream of the processing station. The changes in substrate length within the substrate guides result in localized speed changes of the substrate between the substrate guides. Coordination between the substrate guides allows for localized speed changes of the substrate passing through the processing station without affecting the speed of the substrate upstream of the first substrate guide and downstream of the second substrate guide. As discussed in more detail below, the substrate guides may be configured to engage and/or touch only one side or surface of the advancing substrate. In addition, the substrate guides may be configured with guide members having geometrically determinative relative positions to each other. In some configurations, the orbiting guide members may be adapted to move at a constant angular velocity, while in other configurations, the orbiting guide members may move at a varying angular velocity.

As mentioned above, apparatuses and methods of the present disclosure may be utilized to change the speeds of continuous substrates used in the manufacture of absorbent articles. Such substrates may be utilized in absorbent article components such as, for example: backsheets, topsheets, absorbent cores, front and/or back ears, fastener components, and various types of elastic webs and components such as leg elastics, barrier leg cuff elastics, and waist elastics. Exemplary descriptions of absorbent article components and substrates are provided below with reference to FIG. 6. In addition, substrates may include continuous webs of material and component parts mounted on carrier substrates or may be in the form of a continuous substrate. Although much of the present disclosure is provided in the context of manufacturing absorbent articles, it is to be appreciated that the apparatuses and methods disclosed herein may be applied to the manufacture of other types of articles and products manufactured from continuous substrates. Examples of other articles, products, and processes include packaging components, labels, and metal processing.

FIG. 1 shows an embodiment of an apparatus 100 for varying the speed of an advancing substrate 102 including a first surface 104 and an oppositely disposed second surface 106. The apparatus 100 may be utilized as part of a manufacturing or processing line wherein the substrate advances at a first speed $S_1$ from an upstream position to a downstream position through a process in the machine direction (MD). As such, the apparatus may be configured to provide localized speed changes of the substrate. For example, as shown in FIG. 1, the apparatus 100 may provide localized speed changes of the substrate 102 as the substrate passes through a processing station 108. In particular, the apparatus 100 includes a first substrate guide 110 and a second substrate guide 112. As shown in FIG. 1, the substrate 102 advances in the machine direction (MD) around two idler rollers 114 and enters the first substrate guide 110 at a first speed $S_1$. The substrate 102 travels from the first substrate guide 110 at a second speed $S_2$ through the processing station 108. From the processing station 108, the substrate 102 enters the second substrate guide 112. The substrate 102 then exits the second substrate guide 112 at the first speed $S_1$. As discussed in more detail below, the first substrate guide 110 and second substrate guide 112 operate to change the lengths of the substrate within the respective guides, and thus, vary the second speed $S_2$ of the substrate traveling from the upstream, first substrate guide 110 to the downstream, second substrate guide 112. At the same time, the speed of the substrate entering the first substrate guide and exiting the second substrate guide is maintained at a constant first speed $S_1$. The idler rollers 114 in FIG. 1 show only one example of how the substrate may be advanced to and from the apparatus 100, and as such, it is to be appreciated that various other configurations and arrangements can be utilized.

As previously mentioned, the second speed $S_2$ of the substrate 102 can be varied as the substrate travels through the processing station 108. As discussed in more detail below, the first and second substrate guides 110, 112 may be configured to periodically slow (e.g. second speed, $S_2$, is slower than the first speed, $S_1$) the movement of the substrate 102 in the machine direction (MD) passing through the processing station 108. In some configurations, the first and second substrate guides 110, 112 may be configured to periodically stop (e.g. second speed, $S_2$, is zero) the movement of the substrate 102 in the machine direction (MD) passing through the processing station 108. In yet other configurations, the first and second substrate guides 110, 112 may be configured to periodically reverse the movement of the substrate (e.g. substrate moves upstream relative to the machine direction (MD)) while passing through the processing station 108. A generic representation of a processing station 108 is shown in FIG. 1. As such, it is to be appreciated that the various different operations may be conducted by the processing station. For example, printing, web activation processes, ultrasonic bonding, glue application, attachment of other components and/or substrates, and press-type operations, such as stamp die cutting. In another example, the second substrate speed $S_2$, may be varied to allow for the application of stretched waistbands at desired locations along the length of the substrate, such as described in U.S. patent application Ser. No. 12/417,124, filed on Apr. 2, 2009 and U.S. Patent Application No. 61/056,131, filed on May 27, 2008.

As described in more detail below, the substrate guides may be configured to touch only one side of the substrate. For example, the first and second substrate guides 110, 112 may be configured to touch only the first surface 104 of the substrate 102, and do not touch the second surface 106 of the substrate 102. Such a configuration may be beneficial to reduce negative impacts on other operations performed on the substrate. For example, FIG. 1 shows an example upstream operation 116 wherein glue 118 is applied to the second surface 106 of the substrate 102 before the substrate enters the first substrate guide 110. Because the first and second substrate guides 110, 112 touch only the first surface 104 of the substrate 102, risks of contaminating or otherwise affecting the glue 118 on the second surface 106 may be reduced. In another example, the processing station 108 of FIG. 1 may be configured to adhere or otherwise connect components to the substrate. Because the second substrate guide 112 touches only the first surface 104 of the substrate 102, risks of inadvertently removing, peeling off, otherwise damaging the components may be reduced.

As shown in FIG. 1, the first substrate guide 110 includes a first guide member 120 in the form of a first roller 122, a second guide member 124 in the form of a second roller 126, and a third guide member 128 in the form of a third roller 130. As described below, the substrate 102 travels in the machine direction (MD) at the first speed $S_1$ to the first roller 122; from the first roller 122 to the second roller 126; from the second roller 126 to the third roller 130; and from the third roller 130 to the processing station 108 and/or the second substrate guide 112 at the second speed $S_2$. As shown in FIG. 1, the first roller 122 defines an outer radial surface 132 and rotates around a first center axis 134. The second roller 126 defines an outer radial surface 136 and is rotatably connected with a support member 138 at a second roller axis 140. The support member 138 is adapted to rotate around a second center axis 142. As such, the second roller 126 orbits around the second center axis 142 as the support member 138 rotates. The third roller 130 defines an outer radial surface 144 and rotates around a third center axis 146. As the substrate 102 flows through the first substrate guide 110, only the first surface 104 of the substrate 102 contacts the outer radial surfaces 132, 136, 144 of the first, second, and third rollers 122, 126, 130.

Similar to the first substrate guide 110, the second substrate guide 112 includes a first guide member 148 in the form of a first roller 150, a second guide member 152 in the form of a second roller 154, and a third guide member 156 in the form of a third roller 158. As described below, the substrate 102 travels in the machine direction at the second speed $S_2$ (from the first substrate guide 110 and/or processing station 108) to the first roller 150; from the first roller 150 to the second roller 154; from the second roller 154 to the third roller 158; and from the third roller 158 to continue downstream at the first speed $S_1$. As shown in FIG. 1, the first roller 150 defines an outer radial surface 160 and rotates around a first center axis 162. The second roller 154 defines an outer radial surface 164 and is rotatably connected with a support member 166 at a second roller axis 168. The support member 166 is adapted to rotate around a second center axis 170. As such, the second roller 154 orbits around the second center axis 170 as the support member 166 rotates. The third roller 158 defines an outer radial surface 172 and rotates around a third center axis 174. As the substrate 102 advances through the second substrate guide 112, only the first surface 104 of the substrate 102 contacts the outer radial surfaces 160, 164, 172 of the first, second, and third rollers 150, 154, 158.

Although the guide members 120, 124, 128, 148, 152, 156 of the first and second substrate guides 110, 112 are shown and described as rollers, it is to be appreciated that the guide members can be configured in other ways. For example, in some embodiments, the guide members may be configured as rollers, stationary pins or rods, endless belts, spheres, and/or combinations thereof. In addition, although the support members 138, 166 are shown in the form of wheels, it is to be appreciated that the support members may be configured in other ways, such as for example, an elongate member or rotating arm. Further, some or all of the rollers can be driven rollers, idler rollers, and/or combinations of each. For example, in some embodiments, all the rollers of the first and second substrate guides may be driven by a common belt or chain. In addition, as discussed below, the support members can be rotated at constant or variable speeds.

In some embodiments, the support members 138, 166 may have separate and/or variable speed drives, such as for example, servo motors. In some embodiments, one of the support members is connected with a drive and the other support member is connected with the driven support member through a belt, chain, and/or gears.

As mentioned above, the first substrate guide 110 and the second substrate guide 112 utilize orbital motion of guide members to change the length of the substrate 102 within the substrate guides. In particular, rotation of the support members 138, 166 causes the second rollers 124, 152 to orbit around the second center axes 142, 170. In turn, the orbital motions of the second rollers 124, 152 result in changes of the lengths of substrate within the substrate guides 110, 112. As such, the coordinated rotation of the support members 138, 166 of the first and second substrate guides 110, 112 result in localized speed changes of the substrate 102 passing through the processing station 108 (i.e. a variable second speed, $S_2$), while maintaining a constant first speed, $S_1$.

Figures 2A, 2B:
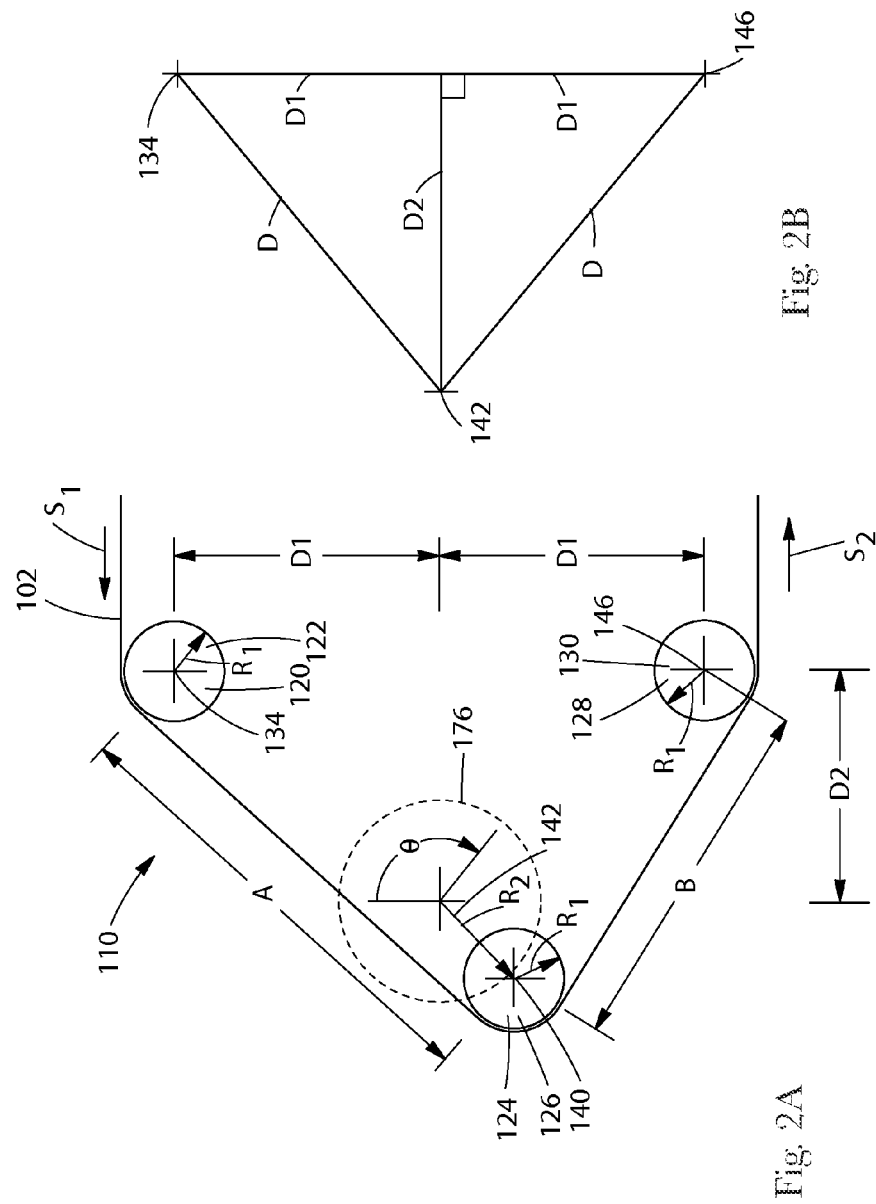
FIG. 2A shows the relative positions of components in a first substrate guide of FIG. 1.
FIG. 2B shows a geometrical representation of the relative positions of the components shown in FIG. 2A.

In each substrate guide 110, 112, the geometrical arrangement of the guide members relative to each other within each substrate guide may be used to configure to the desired drive profile of the substrate guide. For example, FIG. 2A illustrates an example of the first substrate guide 110 such as shown in FIG. 1 labeled to show the relative positions of the guide members 120, 124, 128. The orbital path 176 of the second guide member 124 as the support member 138 rotates around the second center axis 142 is represented by a dashed circle. FIG. 2B shows an example of a triangle formed by drawing lines between the first center axis 134, the second center axis 142, and the third center axis 146 shown in FIG. 2A. In FIG. 2A, the first roller 122, the second roller 126, and the third roller 130 each define equal radii represented as R1. R2 is the distance between the second center axis 142 and the second roller axis 140, and angle, θ, represents the angular position of the second roller axis 140 as the second roller 126 orbits around the second center axis 142. Dimension, A, is the distance between the first center axis 134 and the second roller axis 140, and dimension, B, is the distance between the second roller axis 140 and the third center axis 146. With reference to FIG. 2B, the distance between the second center axis 142 and first center axis 134 is distance, D, and the distance between the second center axis 142 and the third center axis 146 is also distance, D. With reference to FIGS. 2A and 2B, the distance between the first center axis 134 and the third center axis 146 is 2 times D1, and the distance from the second center axis 142 to a line extending between the first center axis 134 and the third center axis 146 is D2. It is to be appreciated that in some embodiments, D1 can be the same as or can be a different length than D2. The length of substrate, $L_{Web1}$, in the first substrate guide can be calculated as:

$$L_{Web1} = \pi R_1 + A + B \text{ where:} \qquad \text{Equation 1:}$$

$$A = \sqrt{(D_1 + R_2\cos(\theta))^2 + (D_2 - R_2\sin(\theta))^2} \text{ and} \qquad \text{Equation 2:}$$

$$B = \sqrt{(D_1 - R_2\cos(\theta))^2 + (D_2 - R_2\sin(\theta))^2} \qquad \text{Equation 3:}$$

With reference to FIGS. 1 and 2A, as the support arm 138 in the first substrate guide 110 rotates around the second center axis 142 (i.e. as θ changes) the length of substrate 102 in the first substrate guide 110, $L_{Web1}$, will vary between a maximum value, $L_{Web1-Max}$, and a minimum value, $L_{Web1-Min}$. In turn, the variance of the length, $L_{Web1}$, causes the second speed $S_2$ of the substrate 102 to change. As such, a specific profile for the second speed $S_2$ of the substrate 102 can be created by varying θ in the above equations 1-3.

Although FIGS. 2A and 2B and the associated equations 1-3 are described with reference to the first substrate guide, it is to be appreciated that the figures and equations can also be applied to calculate the length of substrate, $L_{Web2}$, in the second substrate guide. For example, similar to FIGS. 2A and 2B, FIGS. 2C and 2D show the relative positions of various components in the second substrate guide 112. In particular, FIG. 2C illustrates an example of the second substrate guide 112 such as shown in FIG. 1 labeled to show the relative positions of the guide members 148, 152, 156. The orbital path 178 of the second guide member 152 as the support member 166 rotates around the second center axis 170 is represented by a dashed circle. FIG. 2D shows an example of a triangle formed by drawing lines between the first center axis 162, the second center axis 170, and the third center axis 174 shown in FIG. 2C. Applying the same analysis above to FIGS. 2C and 2D, the length of substrate, $L_{Web2}$, in the second substrate guide 112 can be calculated using Equations 1-3, wherein:

$$L_{Web2} = \pi R_1 + A + B$$

Thus, as the support arm 166 in the second substrate guide 112 rotates around the second center axis 170 (i.e. as θ changes) the length of substrate 102 in the second substrate guide, $L_{Web2}$, will vary from a maximum value, $L_{Web2-Max}$, and a minimum value, $L_{Web2-Min}$. In turn, the variance of length, $L_{Web2}$, can be configured to be the opposite of the variance of the length, $L_{Web1}$, so as to reduce strain and slack in the substrate 102 as the substrate travels from the first substrate guide 110 to the second substrate guide 112. In other words, the first and second substrate guides can be configured to provide a matched substrate flow, wherein $L_{Web1}$ increases at substantially the same rate as $L_{Web2}$ decreases, and wherein $L_{Web1}$ decreases at substantially the same rate as $L_{Web2}$ increases. A matched substrate flow can be achieved by defining certain geometric relationships of the guide members and support members in the first substrate guide 110 and the second substrate guide 112. For example, a matched substrate flow can be achieved by configuring the distances D1 and D2 (discussed above with reference to FIGS. 2A-2D) to be equal or substantially equal to each other in the first substrate guide 110 and in the second substrate guide 112, as well as having distances D1 and D2 in the first substrate guide 110 equal or substantially equal to distances D1 and D2 in the second substrate guide 112.

Figure 3A:
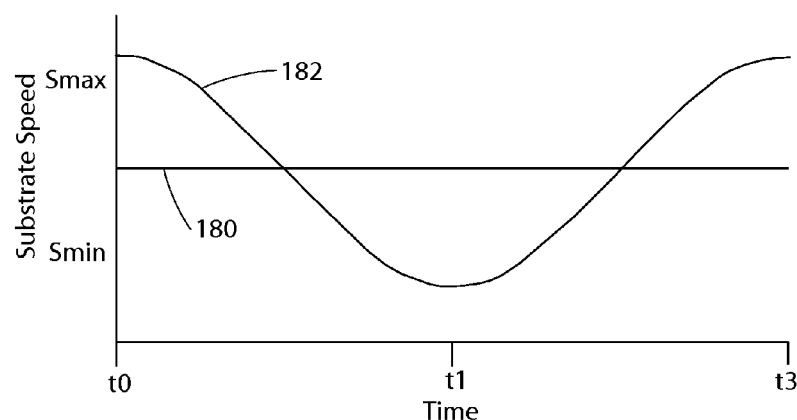
FIG. 3A shows a first example of a substrate speed profile.

As mentioned above, the first and second substrate guides 110, 112 can be configured to provide various different profiles defining the varying second speed $S_2$ of the substrate 102 between the first and second substrate guides 110, 112. In one example, the apparatus 100 can be configured such that the support arms 138, 166 rotate at the same constant angular velocity. In particular, FIG. 3A shows an example of a first speed profile 180 for the first speed $S_1$ and a second speed profile 182 for the second speed $S_2$ of the substrate 102 that may be created by rotating the support arms 138, 166 at a constant angular velocity. In particular, the first speed profile 180 represents a constant first substrate speed $S_1$ versus time, and the second speed profile 182 represents a varying second substrate speed $S_2$ versus time. As shown in FIG. 3A, the second speed profile 182 is a near harmonic speed profile and may be created wherein a maximum second substrate speed, Smax, and a minimum second substrate speed, Smin, are achieved for an instant in time. In some configurations, the minimum second substrate speed, Smin, may be a value greater than zero wherein the substrate may be slowed for an instant in time. In other configurations, the minimum second substrate speed, Smin, may be zero wherein the substrate may be stopped for an instant in time. As such, the processing station 108 may be synchronized to perform an operation when the substrate 102 is at the minimum substrate speed, Smin, wherein the substrate is slowed or stopped for an instant in time. It should also be appreciated that in some embodiments, the processing station may be configured to perform an operation when the substrate 102 is at the maximum second substrate speed, Smax, or at any other desired speed within the speed profile.

In some embodiments, the process station 108 may require more than an instant in time to perform an operation (i.e. not instantaneous). If the operation performed by the process station 108 is sufficiently fast enough and/or robust enough, it may be possible to have the processing station perform the operation during a period of time where the second speed $S_2$ of the substrate 102 is near to a desired speed, such as Smin or Smax. For example, if it is desirable to stop the substrate 102 at the processing station 108 in order to perform an operation that requires a processing time that is more than an instant in time to complete, there may be a window of time around the instantaneous zero second speed where the second speed $S_2$ is close enough to zero such that it is still possible to operate the process within the required processing time.

Figure 3B:
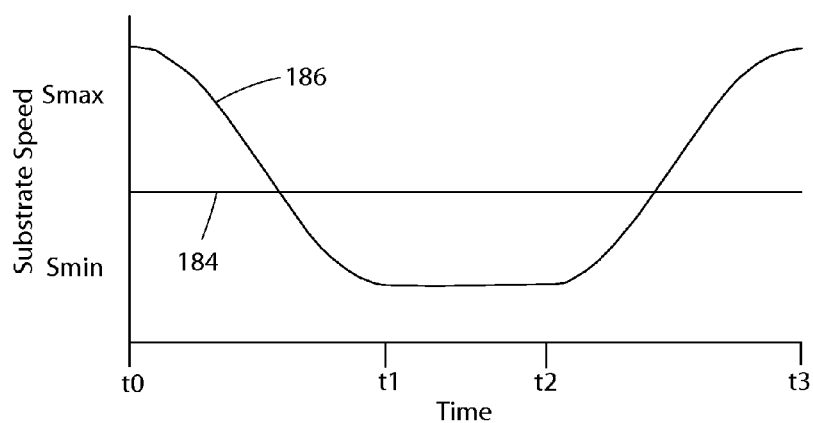
FIG. 3B shows a second example of a substrate speed profile.

In some configurations, a processing station may require more than an instant in time to perform an operation at a desired speed and/or may not be robust enough to adequately operate in a speed range near an instantaneous speed. As such, the apparatus 100 may be configured with one or more variable speed servo motors adapted to rotate the support arms 138, 166 at variable angular velocities. Thus, it is possible to define a substrate speed profile that includes a dwell time at a desired speed that is greater than an instant in time. FIG. 3B shows an example speed profile created with the utilization of variable speed drives. In particular, FIG. 3B shows an example of a first speed profile 184 for the first speed $S_1$ and a second speed profile 186 for the second speed $S_2$ of the substrate 102 that may be created by rotating the support arms 138, 166 at variable angular velocities. In particular, the first speed profile 184 represents a constant first substrate speed $S_1$ versus time, and the second speed profile 186 represents a varying second substrate speed $S_2$ versus time. As shown in FIG. 3B, the second speed profile 186 is defined by a second substrate speed $S_2$ that varies between a maximum second substrate speed, Smax, and a minimum second substrate speed, Smin. And the second substrate speed is maintained at or dwells at a constant minimum speed Smin for a period of time between t1 and t2. In some configurations, the minimum second substrate speed, Smin, may be a value greater than zero wherein the substrate may be slowed for a period of time. In other configurations, the minimum second substrate speed, Smin, may be zero wherein the substrate may be stopped for a period of time. As such, the processing station 108 may be synchronized to perform an operation when the substrate 102 is at the minimum substrate speed, Smin, wherein the substrate is slowed or stopped for a period of time. It should also be appreciated that in some embodiments, the processing station may be configured to perform an operation when the substrate 102 is at the maximum second substrate speed, Smax.

Although the above discussion relating to second substrate speed profiles provides examples wherein the substrate may be slowed, stopped, and/or sped up, it is to be appreciated that the substrate guides may be configured to operate such that the substrate temporarily moves backwards or upstream of the machine direction MD ($S_{min}$ is less than zero). For example, the substrate guides 110, 112 may be configured to operate to slow and stop the substrate 102 advancing from the first substrate guide 110 to the second substrate guide 112, and temporarily reverse direction. As such, the substrate 102 temporarily advances from the second substrate guide 112 to the first substrate guide 110.

Figure 4:
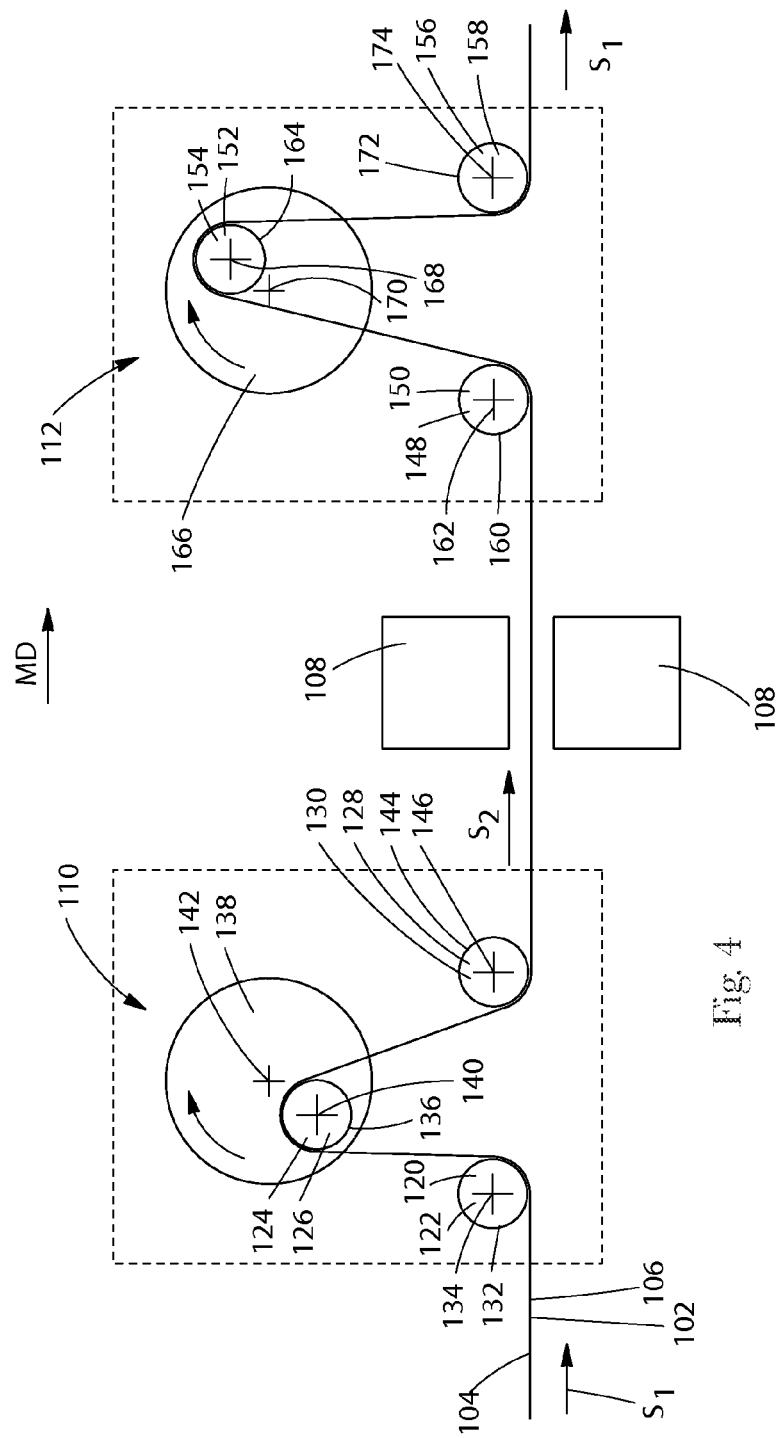
FIG. 4 is a side view of second embodiment of the apparatus according to the present disclosure.

It is to be appreciated that the first and second substrate guides 110, 112 can be configured in different ways while still providing desired speed profiles as discussed above. For example, FIG. 4 shows a second embodiment of the apparatus 100 for varying the speed of an advancing substrate 102 including a first surface 104 and an oppositely disposed second surface 106. The apparatus shown in FIG. 4 includes a first substrate guide 110 and a second substrate guide 112. The substrate advances in the machine direction (MD) at a first speed $S_1$ and enters the first substrate guide 110. The substrate 102 travels from the first substrate guide 110 at a second speed $S_2$ through the processing station 108. From the processing station 108, the substrate enters the second substrate guide 112. The substrate 102 then exits the second substrate guide 112 at the first speed $S_1$. As discussed above with the apparatus of FIG. 1, the first substrate guide 110 and second substrate guide 112 operate to change the lengths of the substrate within the respective substrate guides, and thus, vary the second speed $S_2$ of the substrate traveling from the upstream, first substrate guide 110 to the downstream, second substrate guide 112. At the same time, the speed of the substrate 102 entering the first substrate guide 110 and exiting the second substrate guide 112 is maintained at a constant first speed $S_1$.

Unlike the apparatus of FIG. 1, the first and second substrate guides 110, 112 shown in FIG. 4 touch both the first and second surfaces 104, 106 of the substrate 102. As shown in FIG. 4, the first substrate guide 110 includes a first guide member 120 in the form of a first roller 122, a second guide member 124 in the form of a second roller 126, and a third guide member 128 in the form of a third roller 130. As described below, the substrate 102 travels in the machine direction (MD) at the first speed $S_1$ to the first roller 122; from the first roller 122 to the second roller 124; from the second roller 124 to the third roller 126; and from the third roller 126 to the processing station 108 and/or the second substrate guide 112 at the second speed $S_2$. As shown in FIG. 4, the first roller 122 defines an outer radial surface 132 and rotates around a first center axis 134. The second roller 126 defines an outer radial surface 136 and is rotatably connected with a support member 138 at a second roller axis 140. The support member 138 is adapted to rotate around a second center axis 142. As such, the second roller 126 orbits around the second center axis 142 as the support member rotates. The third roller 130 defines an outer radial surface 144 and rotates around a third center axis 146. As the substrate 102 advances through the first substrate guide 110, the first surface 104 of the substrate engages the outer radial surfaces 132, 144 of the first and third rollers 122, 130, and the second surface 106 of the substrate 102 engages the outer radial surface 136 of the second roller 126.

Similar to the first substrate guide 110, the second substrate guide 112 includes a first guide member 148 in the form of a first roller 150, a second guide member 152 in the form of a second roller 154, and a third guide member 156 in the form of a third roller 158. As described below, the substrate 102 travels in the machine direction (MD) at the second speed $S_2$ (from the first substrate guide 110 and/or processing station 108) to the first roller 150; from the first roller 150 to the second roller 154; from the second roller 154 to the third roller 158; and from the third roller 158 to continue downstream at the first speed $S_1$. As shown in FIG. 4, the first roller 150 defines an outer radial surface 160 and rotates around a first center axis 162. The second roller 154 defines an outer radial surface 164 and is rotatably connected with a support member 166 at a second roller axis 168. The support member 166 is adapted to rotate around a second center axis 170. As such, the second roller 154 orbits around the second center axis 170 as the support member 166 rotates. The third roller 158 defines an outer radial surface 172 and rotates around a third center axis 174. As the substrate 102 advances through the second substrate guide 112, the first surface 104 of the substrate 102 engages the outer radial surfaces 160, 172 of the first and third rollers 150, 158, and the second surface 106 of the substrate 102 engages the outer radial surface 164 of the second roller 154.

It is to be appreciated that the guide members 120, 124, 128, 148, 152, 156 of FIG. 4 can also be configured in other ways as discussed above. In addition, some or all the rollers can be driven rollers, idler rollers, and/or combinations of each, and the support members 138, 166 can be rotated at constant or variable speeds and can be configured in various ways as discussed above.

As discussed above, the first substrate guide 110 and the second substrate guide 112 shown in FIG. 4 utilize orbital motion of guide members 124, 152 to change the length of the substrate 102 within the substrate guides. In particular, rotation of the support members 138, 166 causes the second rollers 124, 152 to orbit around the second center axes 142, 170. In turn, the orbital motions of the second rollers 124, 152 in the first and second substrate guides 110, 112 result in changes of the lengths of substrate within the substrate guides. As such, the coordinated rotation of the support members 138, 166 of the first and second substrate guides result in localized speed changes of the substrate passing through the processing station 108 (i.e. variable second speed $S_2$) while maintaining a constant first speed $S_1$.

Figure 5A:
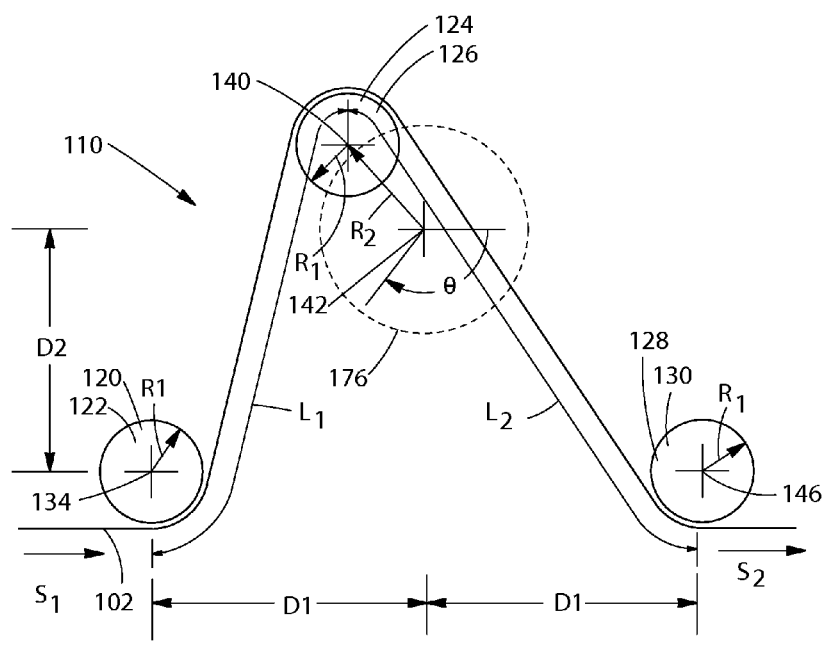
FIG. 5A shows the relative positions of components in a first substrate guide of FIG. 4.
Figure 5B:
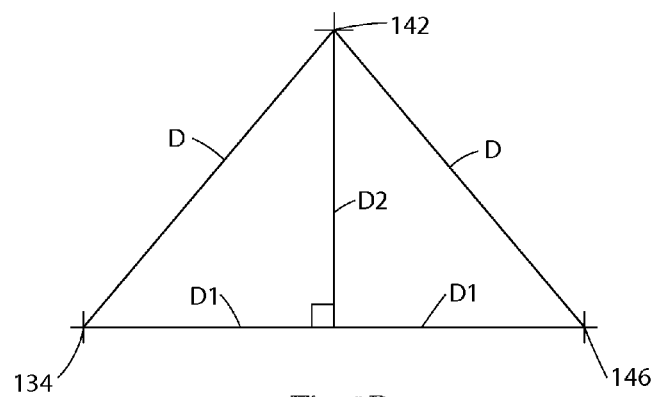
FIG. 5B shows a geometrical representation of the relative positions of the components shown in FIG. 5A.

In each substrate guide 110, 112, the geometrical arrangement of the guide members relative to each other within each substrate guide may be used to configure to the desired drive profile of the substrate guide. For example, FIG. 5A illustrates an example of the first substrate guide 110 such as shown in FIG. 4 labeled to show the relative positions of the guide members 120, 124, 128. The orbital path 176 of the second guide member 124 as the support member 138 rotates around the second center axis 142 is represented by a dashed circle. FIG. 5B shows an example of triangle formed by drawing lines between the first center axis 134, the second center axis 142, and the third center axis 146 shown in FIG. 5A. In FIG. 5A, the first roller 122, the second roller 126, and third roller 130 each define equal radii represented as R1. R2 is the distance between the second center axis 142 and the second roller axis 140, and angle, θ, represents the angular position of the second roller axis 140 as the second roller 126 orbits around the second center axis 142. With reference to the equations below, dimension, A, is the distance between the first center axis 134 and the second roller axis 140, and dimension, B, is the distance between the second roller axis 140 and the third center axis 146. With reference to FIG. 5B, the distance between the second center axis 142 and first center axis 134 is distance, D, and the distance between the second center axis 142 and the third center axis 146 is also distance, D. With reference to FIGS. 5A and 5B, the distance between the first center axis 134 and the third center axis 146 is 2 times D1, and the distance from the second center axis 142 and a line extending between the first and third center axes 134, 146 is D2. It is to be appreciated that in some embodiments, D1 can be the same as or can be a different length than D2. In light of the above discussion, the length of substrate, $L_{Web1}$, in the first substrate guide can be calculated as:

$$L_{Web1} = L_1 + L_2 \text{ where:} \qquad \text{Equation 4:}$$

$$A = \sqrt{(D_1 + R_2\cos(\theta))^2 + (D_2 - R_2\sin(\theta))^2} \qquad \text{Equation 5:}$$

$$L_1 = 2R_1[(\pi/2) - \text{arc}\cos(2R_1/A) + \text{arc}\sin((D_2 - R_2\sin\theta)/A)] + \sqrt{A^2 - 4R_1^2} \qquad \text{Equation 6:}$$

$$B = \sqrt{(D_1 - R_2\cos(\theta))^2 + (D_2 - R_2\sin(\theta))^2} \text{ and} \qquad \text{Equation 7:}$$

$$L_2 = 2R_1[(\pi/2) - \arccos(2R_1/B) + \arcsin((D_2 - R_2\sin\theta)/B)] + \sqrt{B^2 - 4R_1^2} \qquad \text{Equation 8:}$$

With reference to FIGS. 4 and 5A, as the support arm 138 in the first substrate guide 110 rotates around the second center axis 142 (i.e. as θ changes) the length of substrate 102 in the first substrate guide 110, $L_{Web1}$, will vary between a maximum value, $L_{Web1-Max}$, and a minimum value, $L_{Web1-Min}$. In turn, the variance of the length, $L_{Web1}$, causes the second speed $S_2$ of the substrate 102 to change. As such, a specific profile for the second speed $S_2$ of the substrate can be created by varying θ in the above equations 4-8.

Figure 5C:
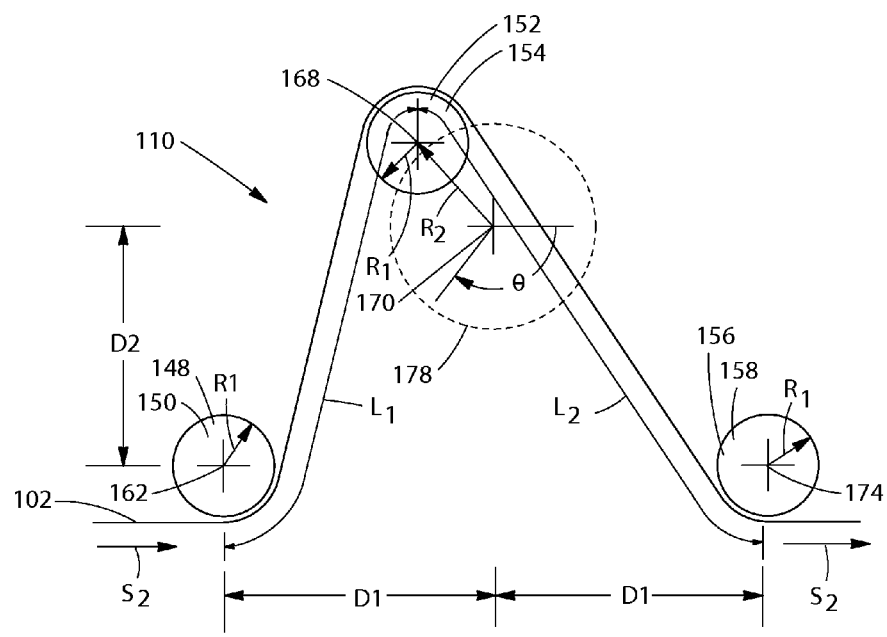
FIG. 5C shows the relative positions of components in a second substrate guide of FIG. 4.
Figure 5D:
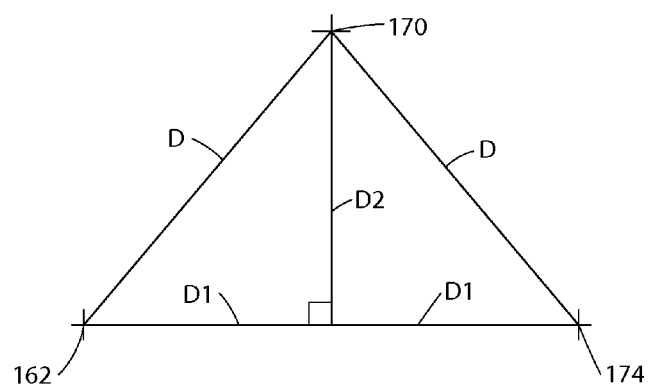
FIG. 5D shows a geometrical representation of the relative positions of the components shown in FIG. 5C.

Although FIGS. 5A and 5B and the associated equations 4-8 are described with reference to the first substrate guide, it is to be appreciated that the figures and equations can also be applied to calculate the length of substrate, $L_{Web2}$, in the second substrate guide. For example, similar to FIGS. 5A and 5B, FIGS. 5C and 5D show the relative positions of various components in the second substrate guide 112. In particular, FIG. 5C illustrates an example of the second substrate guide 112 such as shown in FIG. 4 labeled to show the relative positions of the guide members 148, 152, 156. The orbital path 178 of the second guide member 148 as the support member 166 rotates around the second center axis 170 is represented by a dashed circle. FIG. 5D shows an example of a triangle formed by drawing lines between the first center axis 162, the second center axis 170, and the third center axis 174 shown in FIG. 5C. Applying the same analysis above to FIGS. 5C and 5D, the length of substrate, $L_{Web2}$, in the second substrate guide 112 can be calculated using Equations 4-8, wherein:

$$L_{Web2} = L_1 + L_2$$

Thus, as the support arm 166 in the second substrate guide 112 rotates around the second center axis 170 (i.e. as θ changes) the length of substrate 102 in the second substrate guide, $L_{Web2}$, will vary from a maximum value, $L_{Web2-Max}$, and a minimum value, $L_{Web2-Min}$. In turn, the variance of length, $L_{Web2}$, can be configured to be the opposite of the variance of the length, $L_{Web1}$, so as to reduce strain and slack in the substrate 102 as the substrate travels from the first substrate guide 110 to the second substrate guide 112. In other words, the first and second substrate guides can be configured to provide a matched substrate flow, wherein $L_{Web1}$ increases at substantially the same rate as $L_{Web2}$ decreases, and wherein $L_{Web1}$ decreases at substantially the same rate as $L_{Web2}$ increases. As discussed above, a matched substrate flow can be achieved by defining certain geometric relationships of the guide members and support members in the first substrate guide 110 and the second substrate guide 112. For example, a matched substrate flow can be achieved by configuring the distances D1 and D2 (discussed above with reference to FIGS. 5A-5D) to be equal or substantially equal to each other in the first substrate guide 110 and in the second substrate guide 112, as well as having distances D1 and D2 in the first substrate guide 110 equal or substantially equal to distances D1 and D2 in the second substrate guide 112.

Figure 6:
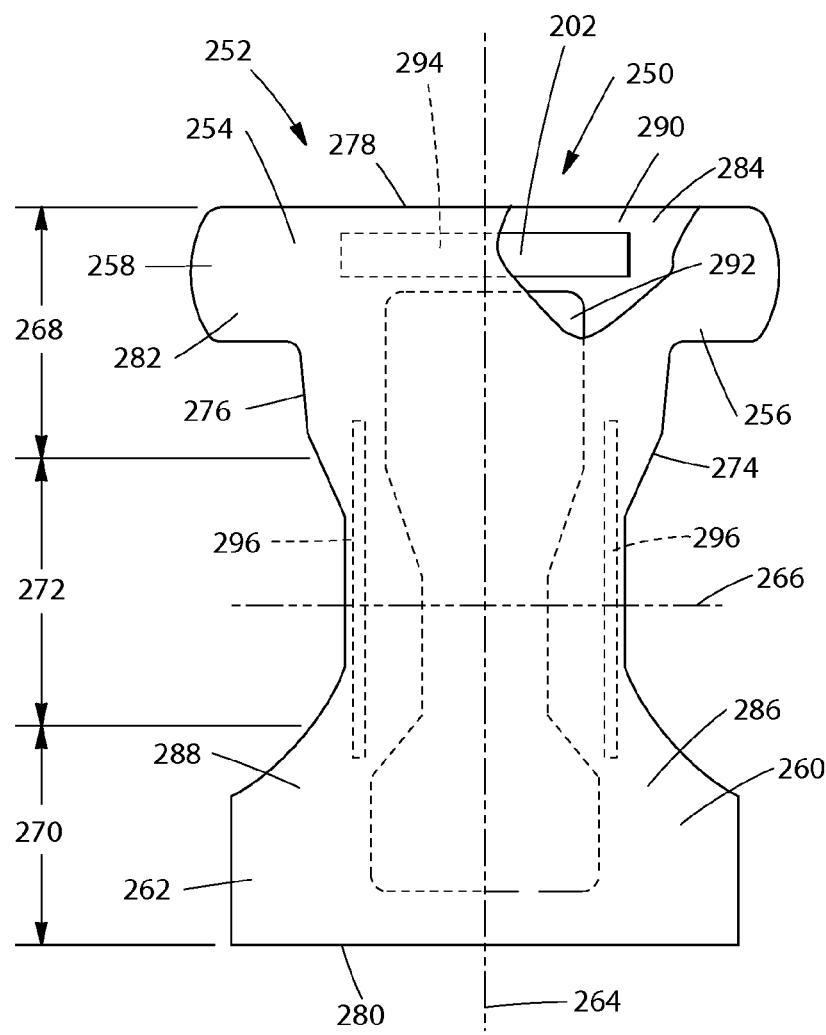
FIG. 6 is a top plan view of a disposable absorbent article.

As previously mentioned, the apparatuses and methods herein may be used to provide for localized speed changes of substrates and components during the manufacture of various different products. For the purposes of a specific illustration, FIG. 6 shows one example of a disposable absorbent article 250, such as described in U.S. Patent Publication No. US2008/0132865 A1, in the form of a diaper 252 that may be constructed from such substrates and components manipulated during manufacture according to the apparatuses and methods disclosed herein. In particular, FIG. 6 is a plan view of one embodiment of a diaper 252 including a chassis 254 shown in a flat, unfolded condition, with the portion of the diaper 252 that faces a wearer oriented towards the viewer. A portion of the chassis structure is cut-away in FIG. 6 to more clearly show the construction of and various features that may be included in embodiments of the diaper.

As shown in FIG. 6, the diaper 252 includes a chassis 254 having a first ear 256, a second ear 258, a third ear 260, and a fourth ear 262. To provide a frame of reference for the present discussion, the chassis is shown with a longitudinal axis 264 and a lateral axis 266. The chassis 254 is shown as having a first waist region 268, a second waist region 270, and a crotch region 272 disposed intermediate the first and second waist regions. The periphery of the diaper is defined by a pair of longitudinally extending side edges 274, 276; a first outer edge 278 extending laterally adjacent the first waist region 268; and a second outer edge 280 extending laterally adjacent the second waist region 270. As shown in FIG. 6, the chassis 254 includes an inner, body-facing surface 282, and an outer, garment-facing surface 284. A portion of the chassis structure is cut-away in FIG. 6 to more clearly show the construction of and various features that may be included in the diaper. As shown in FIG. 6, the chassis 254 of the diaper 252 may include an outer covering layer 286 including a topsheet 288 and a backsheet 290. An absorbent core 292 may be disposed between a portion of the topsheet 288 and the backsheet 290. As discussed in more detail below, any one or more of the regions may be stretchable and may include an elastomeric material or laminate as described herein. As such, the diaper 252 may be configured to adapt to a specific wearer's anatomy upon application and to maintain coordination with the wearer's anatomy during wear.

The absorbent article may also include an elastic waist feature 202 shown in FIG. 6 in the form of a waist band 294 and may provide improved fit and waste containment. The elastic waist feature 202 may be configured to elastically expand and contract to dynamically fit the wearer's waist. The elastic waist feature 202 can be incorporated into the diaper in accordance with the methods discussed herein and may extend at least longitudinally outwardly from the absorbent core 292 and generally form at least a portion of the first and/or second outer edges 278, 280 of the diaper 252. In addition, the elastic waist feature may extend laterally to include the ears. While the elastic waist feature 202 or any constituent elements thereof may comprise one or more separate elements affixed to the diaper, the elastic waist feature may be constructed as an extension of other elements of the diaper, such as the backsheet 290, the topsheet 288, or both the backsheet and the topsheet. In addition, the elastic waist feature 202 may be disposed on the outer, garment-facing surface 284 of the chassis 240; the inner, body-facing surface 282; or between the inner and outer facing surfaces. The elastic waist feature 202 may be constructed in a number of different configurations including those described in U.S. patent application Ser. No. 11/303,686, filed on Dec. 16, 2005; U.S. patent application Ser. No. 11/303,306, filed on Dec. 16, 2005; and U.S. patent application Ser. No. 11/599,862, filed on Nov. 15, 2006; all of which are hereby incorporated by reference herein.

As shown in FIG. 6, the diaper 252 may include leg cuffs 296 that may provide improved containment of liquids and other body exudates. In particular, elastic gasketing leg cuffs can provide a sealing effect around the wearer's thighs to prevent leakage. It is to be appreciated that when the diaper is worn, the leg cuffs may be placed in contact with the wearer's thighs, and the extent of that contact and contact pressure may be determined in part by the orientation of diaper on the body of the wearer. The leg cuffs 296 may be disposed in various ways on the diaper 202.

The diaper 252 may be provided in the form of a pant-type diaper or may alternatively be provided with a re-closable fastening system, which may include fastener elements in various locations to help secure the diaper in position on the wearer. For example, fastener elements may be located on the first and second ears and may be adapted to releasably connect with one or more corresponding fastening elements located in the second waist region. It is to be appreciated that various types of fastening elements may be used with the diaper.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for advancing a substrate having a first surface disposed opposite a second surface, the apparatus comprising: an upstream operation configured to apply glue to the second surface of the substrate;
    a first substrate guide adapted to receive the substrate advancing at a first speed and discharge the substrate advancing at a second speed;
    a second substrate guide adapted to receive the substrate advancing at the second speed and discharge the substrate advancing at the first speed;
    wherein each of the first substrate guide and the second substrate guide comprise:
        a first guide member defining an outer radial surface and a first center axis, wherein the first guide member is positioned such that the first surface of the substrate contacts the outer radial surface of the first guide member;
        a support member adapted to rotate at a variable angular velocity around a second center axis;
        a second guide member defining an outer radial surface and being connected with the support member such that the second guide member orbits around the second center axis as the support member rotates, wherein the second guide member is positioned such that the substrate advances from the first guide member to the second guide member and such that the first surface of the substrate contacts the outer radial surface of the second guide member;
        a third guide member defining an outer radial surface and a third center axis, wherein the third guide member is positioned such that the first surface of the substrate contacts the outer radial surface of the third guide member;
        a variable speed drive connected with the support member adapted to rotate the support member at the variable angular velocity; and
        wherein a first straight line extending directly from the second center axis to the first center axis defines a distance D, wherein a second straight line extending directly from second center axis to the third center axis also defines distance D, wherein the first line is perpendicular to the second line.

2. The apparatus of claim 1, further comprising a processing station disposed between the first substrate guide and the second substrate guide and adapted to receive the substrate advancing from the first guide at the second speed.

3. The apparatus of claim 2, wherein the processing station attaches a component to the second surface of the substrate.

4. The apparatus of claim 1, wherein the first guide member comprises a first roller adapted to rotate around the first center axis; wherein the second guide member comprises a second roller rotatably connected with the support member; and wherein the third guide member comprises a third roller adapted to rotate around the third center axis.

5. The apparatus of claim 1, wherein the support member comprises a wheel adapted to rotate around the second center axis.

* * * * *